(12) United States Patent
Cross

(10) Patent No.: US 9,830,140 B2
(45) Date of Patent: *Nov. 28, 2017

(54) IDENTIFICATION OF AN APPLICATION ASSOCIATED WITH A THIRD PARTY SYSTEM AND TRANSMISSION OF APPLICATION INSTALLATION INFORMATION TO A USER BY AN ONLINE SYSTEM

(71) Applicant: Facebook, Inc., Menlo Park, CA (US)

(72) Inventor: Simon Cross, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,953

(22) Filed: May 30, 2017

(65) Prior Publication Data

US 2017/0262271 A1 Sep. 14, 2017

Related U.S. Application Data

(63) Continuation of application No. 14/500,731, filed on Sep. 29, 2014, now Pat. No. 9,672,021.

(51) Int. Cl.
*G06F 9/445* (2006.01)
*H04L 29/08* (2006.01)
*G06F 21/12* (2013.01)
*G06F 21/31* (2013.01)

(52) U.S. Cl.
CPC .............. *G06F 8/61* (2013.01); *G06F 21/128* (2013.01); *G06F 21/31* (2013.01); *H04L 29/08981* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,250,145 B2 * | 8/2012 | Zuckerberg | G06Q 30/02 705/80 |
| 9,223,961 B1 | 12/2015 | Sokolov | |
| 2006/0004789 A1 | 1/2006 | Lunt et al. | |
| 2009/0070412 A1 | 3/2009 | D'Angelo et al. | |
| 2010/0036892 A1 | 2/2010 | Pandya | |

(Continued)

OTHER PUBLICATIONS

Shehab et al., "Access control for online social networks third party Applications," copyright, 2012 Elsevier Ltd.*

(Continued)

*Primary Examiner* — Insun Kang
(74) *Attorney, Agent, or Firm* — Fenwick & West LLP

(57) ABSTRACT

An online system allows a user to provide information for accessing the online system to a third party system, which communicates the information to the online system. Based on the received information, the online system determines whether the user is authorized to access the third party system. Additionally, the online system determines whether an application is associated with the third party system. When determining whether an application is associated with the third party system, the online system may also account for characteristics of a client device associated with the user. If an application is associated with the third party system, the online system sends information for installing the application to the client device associated with the user.

20 Claims, 2 Drawing Sheets

(56) References Cited

U.S. PATENT DOCUMENTS

| | | |
|---|---|---|
| 2013/0007122 A1 | 1/2013 | Su |
| 2013/0036016 A1 | 2/2013 | Pattan et al. |
| 2013/0047146 A1* | 2/2013 | Ugur ............... G06Q 50/01 717/172 |
| 2013/0080526 A1 | 3/2013 | Gill et al. |
| 2013/0282806 A1 | 10/2013 | Steinberg et al. |
| 2014/0164500 A1 | 6/2014 | Fisch et al. |
| 2014/0207585 A1* | 7/2014 | Walke ............ G06Q 30/0277 705/14.73 |
| 2014/0207900 A1 | 7/2014 | Liu et al. |
| 2014/0214931 A1* | 7/2014 | Sidhu ............... H04L 65/403 709/204 |
| 2014/0237236 A1 | 8/2014 | Kalinichenko et al. |
| 2014/0237467 A1 | 8/2014 | Heddleston |
| 2014/0244561 A1 | 8/2014 | Cheng et al. |
| 2014/0289052 A1 | 9/2014 | Schultz et al. |
| 2014/0359602 A1* | 12/2014 | Sawaya ............... G06F 8/62 717/176 |
| 2015/0073892 A1* | 3/2015 | Brown ............ G06Q 30/0246 705/14.45 |
| 2015/0088663 A1 | 3/2015 | Schechter et al. |
| 2015/0106801 A1* | 4/2015 | Agrawal ............... G06F 8/60 717/177 |
| 2016/0283740 A1 | 9/2016 | Roundtree |
| 2016/0309000 A1 | 10/2016 | Mao et al. |

OTHER PUBLICATIONS

Kontaxis et al., "Minimizing information disclosure to third parties in social platforms," 2011.

Schiffman et al., "DAuth: Fine-grained Authorization Delegation for Distributed Web Application Consumers," 2010.

Venkatesan et al., "Enhancement of Social Network Security by Third Party Application ," International Journal of Advanced Research in Computer Science and Software Engineering, vol. 3, Issue 3, Mar. 2013.COPYRGT. 2013, IJARCSSE.

Wang et al., "Third-Party Apps on Facebook: Privacy and the Illusion of Control," 2011 ACM.

* cited by examiner

IDENTIFICATION OF AN APPLICATION ASSOCIATED WITH A THIRD PARTY SYSTEM AND TRANSMISSION OF APPLICATION INSTALLATION INFORMATION TO A USER BY AN ONLINE SYSTEM

CROSS REFERENCE TO RELATED APPLICATIONS

This application is a continuation of co-pending U.S. application Ser. No. 14/500,731, filed Sep. 29, 2014, which is incorporated by reference in its entirety.

BACKGROUND

This invention relates generally to installation of applications on a client device, and more specifically to an online system providing information for installing an application associated with a third party system to a client device.

Third party systems may provide applications to users to increase user engagement, revenue, and other goals. To distribute an application to users, third party systems may provide users with access to a link to download a client application in an advertisement or another type of message. By accessing the link, the application is downloaded from the third party system or from another source and installed on the client device from which the application was accessed.

However, users typically use multiple devices when accessing online content, making it difficult for a user to install an application associated with a third party system on different devices. As different third party systems are associated with different applications, users may have difficulty keeping track of which applications associated with third party systems are installed on different devices. Because an application associated with a third party system typically enhances user interaction with content from the third party system, a user accessing content provided by the third party system via a device on which an application associated with the third party system is not installed may be discouraged from interacting the third party system's content.

SUMMARY

An online system, such as a social networking system, stores information describing applications associated with various third party systems. The stored information includes information identifying a third party system and identifiers associated with one or more applications associated with the third party system, such as applications associated with the third party system and configured to be executed by different types of client devices. For example, the stored information identifies a third party system and associates one or more applications with the third party system. Information describing various applications may also be stored. For example, information identifying a type of client device associated with an application or characteristics of the application is included information identifying the application and associated with a third party system. In various embodiments, the information stored for an application includes information for installing the application. Example information for installing an application includes a link to a source for retrieving instructions for installing the application or instructions for directing an application installer (e.g., an application store) executing on a client device to information for installing the application.

Additionally, the online system may exchange information with one or more third party systems, allowing a user of the online system to access a third party system using information for accessing the online system. The user provides access information for accessing the online system to the third party system, which communicates the access information to the online system. If the online system determines the access information authorizes the user to access the online system, an indication that the access information is authorized by the online system is transmitted to the third party system, which allows the user to access the third party system. For example, the user provides a username and password for accessing the online system to the third party system, which communicates the username and password to the online system; if the online system determines the username and password match a stored username and password, the online system notifies the third party system that the user is authorized to access the online system and the third party system allows access to the user in response to the authorization from the online system. This simplifies user access to third party systems by allowing user to access one or more third party systems using information for accessing the online system rather than using different information to access each third party system.

An application may be associated with a third party system to improve user interaction with the third party system. For example, an application associated with the third party system is configured to execute on certain types of client devices to provide users accessing the third party system using the types of client devices with increased functionality or simplified access to content provided by the third party system. To improve interaction with the third party system, when a user accesses the third party system using online system access information, the online system determines whether its maintained information identifies an application associated with the third party system. For example, the online system determines an identifier associated with the third party system to identifiers associated with a third party system associated with an application by the online system. If the online system determines an application is associated with the third party system, the online system transmits information for installing the application to a client device associated with the user.

After receiving the information for installing the application from the online system, the client device determines whether the application is installed on the client device. For example, the client device compares application identifiers of installed applications to an identifier associated with the application. If the identifier associated with the application matches an application identifier of an installed application, the client device does not take further action. However, if the identifier associated with the application does not match an application identifier of an installed application, the client device presents information for installing the application associated with the third party system. In some embodiments, the online system transmits a request to the client device to determine if the application is installed on the client device and transmits information for installing the application if the client device indicates to the online system that the application is not installed.

DETAILED DESCRIPTION

System Architecture

Figure 1:
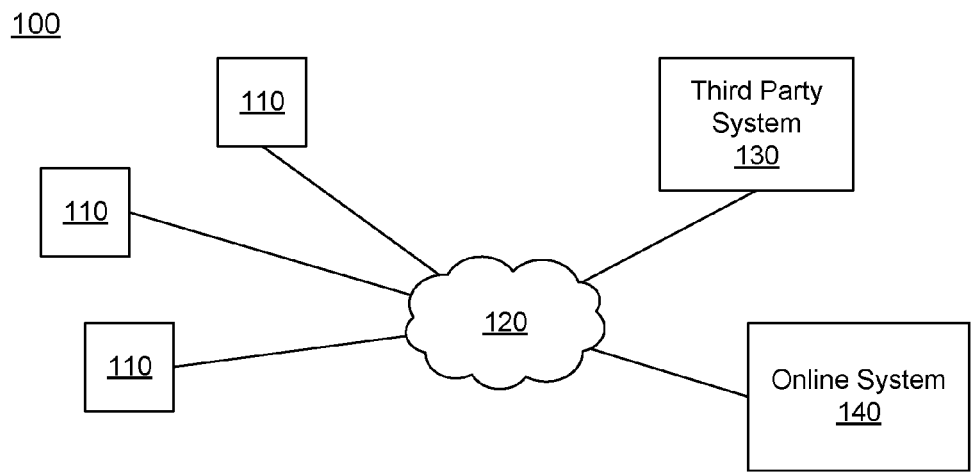
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

Different client devices 110 may have different device types that may differently execute applications or may execute different applications. For example, a client device 110 may execute native applications, which are specifically designed to be executed on the client device's operating system and firmware (but may be modified for execution by different client devices 110 having different operating systems and/or firmware). Alternatively, a client device 110 may execute applications configured to be executed by a type of operating system independent of the firmware or hardware of the client device 110 on which it is executed. A device type may indicate whether a client device 110 executes an embedded operating system or a desktop operating system, or may identify a type of embedded operating system or a type of desktop operating system executed by the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
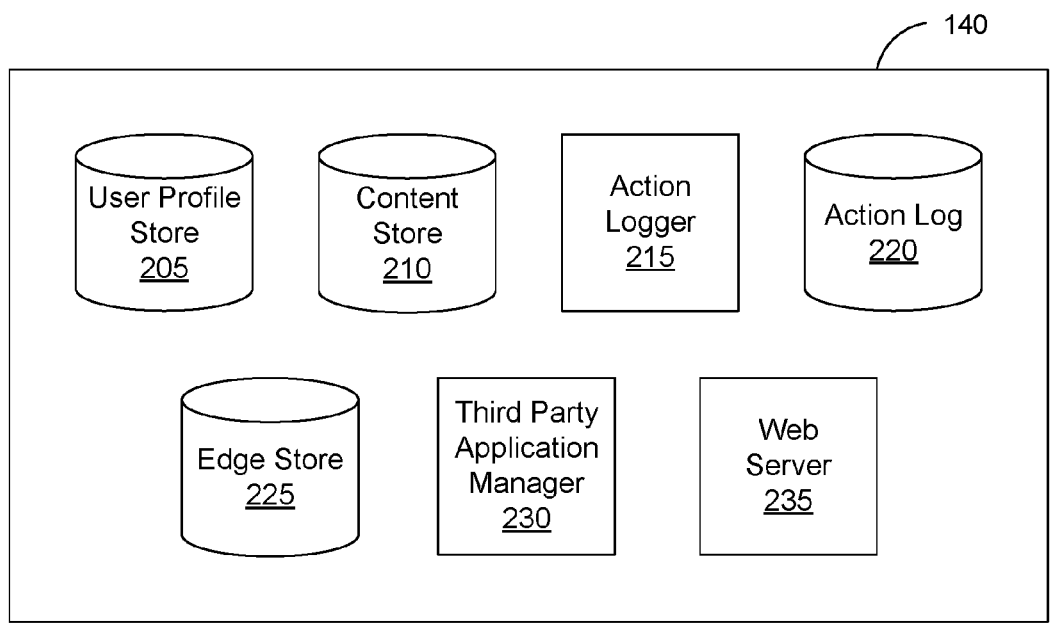
FIG. 2 is a block diagram of an online system, in accordance with an embodiment.

FIG. 2 is a block diagram of an architecture of the online system 140. In some embodiments, the online system 140 is a social networking system. The online system 140 shown in FIG. 2 includes a user profile store 205, a content store 210, an action logger 215, an action log 220, an edge store 225, a third party application manager 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220. Additionally, a user profile may include information describing one or more client devices 110 associated with a user. For example, a user profile includes a client device identifier, a type of client device 110, and information identifying one or more applications installed on a client device 110 in a user profile to maintain information about a client device 110 associated with the user.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The third party application manager 230 includes information identifying various third party systems 130 and one or more applications associated with each third party system 130. For example, the third party application manager 230 includes associations between an identifier associated with a third party system 130 and identifiers of one or more applications associated with the third party system 130. Different applications for execution by different types of client devices 110 may be associated with a third party system 130, allowing the third party system 130 to provide various applications optimized for different types of client devices 110. The third party application manager 230 may include information identifying a type of client device 110, or other characteristics, associated with an application. Additionally, information for installing an application may be stored in conjunction with an identifier associated with an application. Hence, in various embodiments, the third party application manager 230 associates an identifier of a third party system 130 with one or more identifiers associated with applications associated with the third party system 130 as well as with information for installing one or more of the applications. Example information for installing an application include a network address identifying a source from which instructions for installing the application are retrieved or an application identifier for communication to an application installer executing on a client device 110.

If the online system 140 receives access information associated with an online system user from a third party system 130, the third party application manager 230 determines whether an application is associated with the third party system 130. An online system user may provide information used to access the online system 140 to a third party system 130, which communicates the information to the online system 140 along with an identifier of the third party system 130. If the online system 140 determines that the information from the third party system 130 authorizes the user to access the online system 140, the online system 140 communicates an indication to the third party system 130 of whether the user is authorized to access the online system 140. If the user is authorized to access the online system 140, the third party system 130 allows the user to access content from the third party system 130.

Additionally, based on the information from the third party system 130, the third party application manager 230 determines if an application is associated with the third party system 130. For example, the third party application manager 230 compares an identifier of the third party system 130 with stored associations between identifiers of third party systems 130 and identifiers of applications. If the identifier of the third party system 130 matches a stored identifier of a third party system 130, the third party application manager 230 identifies an application associated with the third party system 130. Information for installing the identified application is retrieved by the third party application manager 230, which communicates the information for installing the identified application to a client device 110 associated with the user. This allows the user to more easily install an application associated with the third party system 130 on a client device 110 to improve user interaction with the third party system 130. Identification of an application associated with a third party system 130 and transmission of information for installing an application associated with the third the third party system is further described below in conjunction with FIG. 3

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Figure 3:
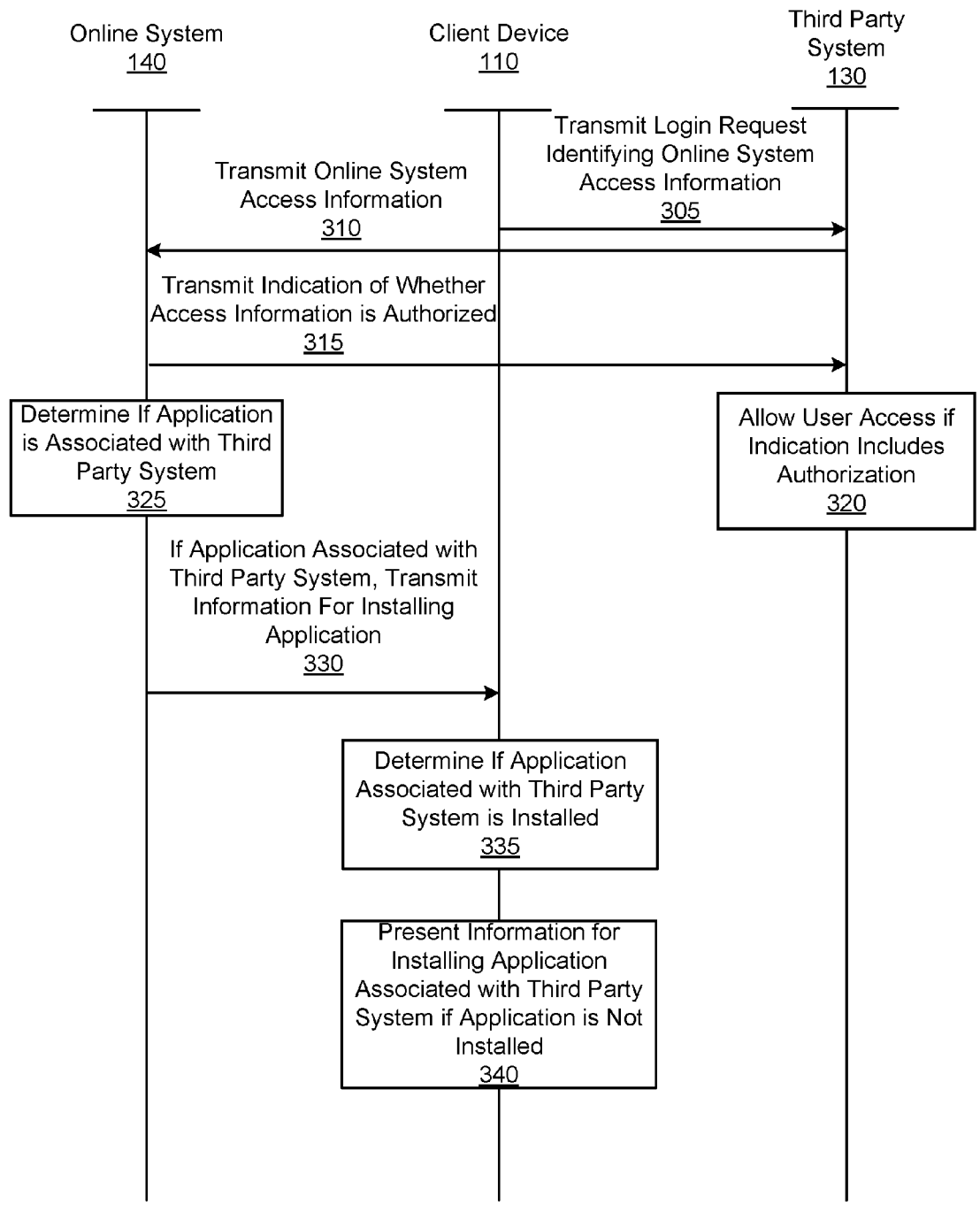
FIG. 3 is an interaction diagram of a method for transmitting information for installing an application associated with a third party system to an online system user, in accordance with an embodiment The figures depict various embodiments for purposes of illustration only. One skilled in the art will readily recognize from the following discussion that alternative embodiments of the structures and methods illustrated herein may be employed without departing from the principles described herein.

Transmitting Installation Information for an Application Associated with a Third Party System FIG. 3 is an interaction diagram of one embodiment of a method for transmitting information for installing an application associated with a third party system 130 to a user of an online system 140. In other embodiments, the steps of the method may be performed in different orders than the order described in conjunction with FIG. 3. Additionally, the method may include different or additional steps than those described in conjunction with FIG. 3.

The online system 140 stores information describing applications associated with various third party systems 130, as described above in conjunction with FIG. 2. The stored information includes information identifying a third party system 130 and identifiers associated with one or more applications associated with the third party system, such as applications associated with the third party system 130 and configured to be executed by different types of client devices 110. For example, the stored information identifies a third party system 130 (e.g., by using an identifier associated with the third party system 130) and associates one or more applications with the third party system 130. Information describing various applications may also be stored by the online system 140. For example, information identifying a type of client device 110 associated with an application or identifying characteristics of the application is included in the information identifying the application and associating the application with a third party system 130.

In various embodiments, the stored information for an application includes information for installing the application, allowing the online system 140 to maintain information for installing an application. Example information for installing an application includes a link to a location for retrieving instructions for installing the application or instructions for directing an application installer (e.g., an application store) executing on a client device 110 to instructions for installing the application. Thus, in some embodiments, the online system 140 stores an identifier associated with a third party system 130, identifiers associated with one or more applications associated with the third party system 130, an association between the identifier associated with the third party system 130 and the identifiers associated with the one or more applications associated with the third party system 130, and information for installing various applications from the one or more applications.

A user of the online system 140 transmits 305 a login request to a third party system 130 from a client device 110 to access content provided by the third party system 130.

The login request includes information identifying the user and information used by the user to access the online system 140 ("access information"). The third party system 130 transmits 310 the access information to the online system 140 along with an identifier associated with the third party system 130, which determines whether the access information authorizes the user to access the online system 140. For example, the user transmits an identification of the online system 140 as well as a username and password used to access the online system 140 to the third party system 130, which transmits 310 the username and password to the online system 140. If the online system 140 determines the username and password match information associated with the user by the online system 140, the user's identity is verified by the online system 140, so the user is authorized to access the online system 140.

An indication of whether the user is authorized to access the online system 140 is transmitted 315 from the online system 140 to the third party system 130. The transmitted indication specifies whether the online system 140 determines the user is authorized to access the online system 140 based on the access information received from the third party system 130. If the online system 140 determines the access information does not authorize the user to access the online system 140, the third party system 130 prevents the user from accessing content provided by the third party system 130. However, if the indication form the online system 140 indicates the access information allows the user to access the online system 140, the third party system 130 allows 320 the user to access content provided by the third party system 130. Use of information for accessing the online system 140 to access a third party system 130 is further described in U.S. patent application Ser. No. 14/471,313, filed on Aug. 28, 2014, which is incorporated by reference herein in its entirety.

Additionally, if the online system 140 determines the user is authorized to access the online system 140 based on the access information received from the third party system 130, the online system 140 determines 325 if an application is associated with the third party system 130. As an application associated with the third party system 130 may improve user interaction with the third party system 130 by providing certain functionality or simplifying access to content, using an application associated with a third party system 130 may enhance user interaction with the third party system 130. For example, an application associated with the third party system 130 is configured to execute on a certain type of client device 110 to leverage capabilities of the type of client device 110 to enhance user interaction with content from the third party system 130. After determining the user is authorized to access the online system 140, the online system 140 compares the identifier associated with the third party system 130 received with the access information to stored identifiers associated with third party systems 130. If the identifier associated with the third party system 130 matches a stored identifier associated with a third party system 130, the online system 140 determines 325 whether one or more applications are associated with the identifier associated with the third party system 130. For example, the online system 140 determines 325 whether an identifier associated with an application is associated with the identifier associated with the third party system 130.

Information associated with the user or with the client device 110 associated with the user may be used to determine 325 whether the third party system 130 is associated with an application. For example, the online system 140 determines 325 whether an application associated with a type corresponding to the client device 110 associated with the user is associated with the third party system 130. Additional information describing the type of client device 110 associated with the user may also be used when determining 325 whether the third party system 130 is associated with an application.

If the online system 140 determines 325 an application is associated with the third party system 130, information for installing the application is retrieved by the online system 140 and transmitted 330 to the client device 110 associated with the user. Information for installing the application may be retrieved from information stored by the online system 140 and associated with the application. The information for installing the application may be retrieved from the information stored by the online system 140, may be retrieved from the third party system 130, or may be retrieved from any suitable source. Various types of communication channels may be used to transmit 330 the information for installing the application associated with the third party system 130 to the client device 110 associated with the user. In one embodiment, the instructions for installing the application associated with the third party system 130 are a link to a source for retrieving instructions for installing the application included in a text message, in an e-mail, in a notification message, or in another suitable type of communication. Alternatively, the instructions for installing the application associated with the third party system 130 are instructions for execution by the client device to configure an application installer (e.g., an application store) executing on a client device 110 to install the application.

When the client device 110 receives the information for installing the application from the online system 140, the client device 110 determines 335 whether the application is installed on the client device 110. For example, the client device 110 compares application identifiers of applications installed on the client device 110 to an identifier associated with the application. If the identifier associated with the application matches an application identifier of an application installed on the client device 110, the client device 110 does not take further action. However, if the identifier associated with the application does not match an application identifier of an application installed on the client device 110, the client device 110 presents 340 the information for installing the application associated with the third party system 130 received from the online system 140. In some embodiments, the online system 140 transmits a request to the client device 110 to determine if the application is installed on the client device 110 before transmitting 340 the information for installing the application and transmits 340 the information for installing the application if the client device 110 responds to the request with information indicating the application is not installed. Alternatively, the online system 140 accesses stored information associated with the user and maintained by the online system 140 to determine whether the application is installed on the client device 110. For example, the online system 140 maintains information describing client devices 110 associated with the user and applications installed on the client devices 110 associated with the user; the online system determines whether the stored information describing applications stored on client devices 110 associated with the user indicates the application is installed on the client device 110. If the stored information associated with the client devices 110 associated with the user does not indicate the application is installed on the client device 110, the online system 140 transmits 340 the information for installing the application to the client device 110.

The client device 110 may present 340 the information for installing the application using any suitable method. As an example, the client device 110 presents 340 a text message or a notification message including a link to a source for retrieving instructions for installing the application. Interacting with the presented 340 link allows the user to retrieve the instructions for installing the application on the client device 110. In another example, the client device 110 executes instructions received from the online system 140 that cause an application installer executing on the client device 110 to retrieve information for installing the application. The application installer may present the user with information describing the application and prompt the user to confirm installation of the application or may install the application based information retrieved from the third party system 130 or from another source.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
transmitting, by a client device, a login request to a third party system to access content provided by the third party system, the login request including identifying information for a user of the client device and access information used by the user to access an online system, the third party system transmitting the access information to the online system to verify that the user is authorized to access the online system using the access information responsive to receiving the login request, where the online system:
  if the user is authorized to access the online system, determines, using the access information, that an application for the third party system exists and is not installed on the client device; and
  transmits, to the client device, installation information for installing the application associated with the third party system;
receiving, by the client device, the installation information from the online system;
determining, by the client device, whether the application associated with the third party system is installed on the client device; and
presenting the installation information for installing the application associated with the third party system on a user interface of the client device.

2. The method of claim 1, wherein determining whether the application associated with the third party system is installed on the client device includes:
comparing application identifiers of applications installed on the client device to an identifier associated with the application.

3. The method of claim 1, further comprising:
receiving, by the client device a request from the online system for information to determine whether the application is installed on the client device.

4. The method of claim 1, wherein the online system accesses stored information associated with the user and maintained by the online system to determine whether the application is installed on the client device, the online system maintaining information describing client devices associated with the user and applications installed on the client devices.

5. The method of claim 1, wherein the online system transmits the installation information for installing the application to the client device in response to determining that the stored information associated with the client devices associated with the user does not indicate the application associated with the third party system is installed on the client device.

6. The method of claim 1, wherein the information for installing the application associated with the third party system includes a link to a source including instructions for installing the application associated with the third party system.

7. A computer-implemented method comprising:
transmitting, by a client device, a login request to a third party system to access content provided by the third party system, the login request including identifying information for a user of the client device and access information used by the user to access an online system, the third party system transmitting the access information to the online system to verify that the user is authorized to access the online system using the access information responsive to receiving the login request, where the online system:
  if the user is authorized to access the online system, determines, using the access information, that an application for the third party system exists and is not installed on the client device; and
  transmits, to the client device, installation information for installing the application associated with the third party system;
receiving, by the client device, the installation information from the online system;
determining, by the client device, that the application associated with the third party system is not installed on the client device; and
presenting, on a user interface of the client device, the installation information for the user to install the application associated with the third party system.

8. The computer-implemented method of claim 7, wherein determining whether the application associated with the third party system is installed on the client device includes:
comparing application identifiers of applications installed on the client device to an identifier associated with the application.

9. The computer-implemented method of claim 7, further comprising:
receiving, by the client device a request from the online system for information to determine whether the application is installed on the client device.

10. The computer-implemented method of claim 7, wherein the online system accesses stored information associated with the user and maintained by the online system to determine whether the application is installed on the client device, the online system maintaining information describing client devices associated with the user and applications installed on the client devices.

11. The computer-implemented method of claim 7, wherein the online system transmits the installation information for installing the application to the client device in response to determining that the stored information associated with the client devices associated with the user does not indicate the application associated with the third party system is installed on the client device.

12. The computer-implemented method of claim 7, wherein the information for installing the application associated with the third party system includes a link to a source including instructions for installing the application associated with the third party system.

13. A computer program product comprising a non-transitory computer-readable storage medium having instructions encoded thereon that, when executed by a processor, cause the processor to:
store, at an online system, an association between an application and a third party system and information for installing the application;
receive, at the online system, information from a third party system identifying the third party system and including information associated with a user of the online system for accessing the online system;
determine, by the online system, that the received information from the third party system authorizes the user to access the online system;
determine, by the online system, that the application is associated with the third party system based on the stored data;
retrieve, by the online system, the information for installing the application associated with the third party system; and
transmit, by the online system, the information for installing the application associated with the third party system to a client device associated with the user of the online system, the information for installing the application being transmitted to the client device for presentation to the user of the online system on a user interface of the client device.

14. The computer program product of claim 13, wherein transmitting the information for installing the application further comprises:
transmitting a request for an indication of whether the application associated with the third party system is installed on the client device to the client device associated with the user; and
transmitting the information for installing the application associated with the third party system to the client device if the indication received from the client device indicates the application associated with the third party system is not installed on the client device associated with the user.

15. The computer program product of claim 13, wherein retrieving the information for installing the application associated with the third party system from the stored data comprises:
determining whether the application associated with the third party system is installed on the client device associated with the user based on information associated with the user by the online system; and
retrieving the information for installing the application associated with the third party system from the stored data if it is determined that the application associated with the third party system is not installed on the client device associated with the user.

16. The computer program product of claim 13, wherein transmitting the information for installing the application associated with the third party system to the client device associated with the user of the online system further comprises:
transmitting instructions that, when executed by the client device associated with the user of the online system, configure an application installer executing on the client device associated with the user of the online system to install the application.

17. The computer program product of claim 13, wherein determining that the application is associated with the third party system based on the stored data comprises:
determining a type associated with the client device associated with the user; and
determining whether an application associated with the type associated with the client device associated with the user is associated with the third party system.

18. The computer program product of claim 17, wherein the type associated with the client device associated with the user specifies an operating system associated with the client device associated with the user.

19. The computer program product of claim 13, wherein the information for installing the application associated with the third party system includes a link to a source including instructions for installing the application associated with the third party system.

20. The computer program product of claim 19, wherein transmitting the information for installing the application associated with the third party system to the client device associated with the user of the online system further comprises:
    including the link in a text message or a notification message transmitted from the online system to the client device associated with the user of the online system.

* * * * *